(12) United States Patent (10) Patent No.: US 7,688,187 B2
Caird et al. (45) Date of Patent: Mar. 30, 2010

(54) EARLY DETECTION SYSTEM AND METHOD FOR EXTERIOR VEHICLE CARGO

(76) Inventors: Andrew J. Caird, 1065 Chestnut St., Ann Arbor, MI (US) 48104; Timothy G. Schuster, 448 3$^{rd}$ St., Ann Arbor, MI (US) 48103

( * ) Notice: Subject to any disclaimer, the term of this patent is extended or adjusted under 35 U.S.C. 154(b) by 576 days.

(21) Appl. No.: 11/557,129

(22) Filed: Nov. 7, 2006

(65) Prior Publication Data

US 2007/0103282 A1 May 10, 2007

Related U.S. Application Data

(60) Provisional application No. 60/734,084, filed on Nov. 7, 2005.

(51) Int. Cl.
*B60Q 1/00* (2006.01)
*B62J 3/00* (2006.01)
*G08B 23/00* (2006.01)

(52) U.S. Cl. ............... 340/436; 340/425.5; 340/432; 340/693.9; 340/693.5; 340/693.6; D8/349; D8/355; D8/382; D8/394; D8/397; D8/398

(58) Field of Classification Search ............... None
See application file for complete search history.

(56) References Cited

U.S. PATENT DOCUMENTS

| 3,360,775 | A | | 12/1967 | Schroeder |
| 3,716,833 | A | * | 2/1973 | Roth ............... 340/904 |
| 4,833,469 | A | | 5/1989 | David |
| 4,916,429 | A | | 4/1990 | Hicks et al. |
| 5,160,927 | A | | 11/1992 | Cherry et al. |

(Continued)

FOREIGN PATENT DOCUMENTS

FR 2831859 5/2003

(Continued)

*Primary Examiner*—Julie Lieu
(74) *Attorney, Agent, or Firm*—Dickinson Wright PLLC

(57) ABSTRACT

A method and device for attaching directly to a high-profile and/or elongated item of cargo (10, 110) transported on the exterior payload area of a vehicle (16) prevents collisions with obstructions (36, 136). A detector (38, 138) remotely detects a distant obstruction (36, 136) in the path of the cargo (10, 110) using ultrasonic, infra red, or other sensing techniques. The detector (38, 138) is mounted directly to the cargo (10, 110) by a mounting member (42, 142) which releasably surrounds at least a portion of the cargo (10, 110) and provides an enveloping, frictionally constricting engagement so as to maintain the detector (38, 138) in a preferred operating orientation. The mounting member (42, 142) preferably includes a bracket (44, 144) configured to attach at multiple, spaced points on the cargo (10, 110). In one alternative configuration, the mounting member (42, 142) comprises a flexible membrane (190) which wraps around a portion of the cargo (110) and is securely held in position thereto using tension straps (192). Alarm features include a light source (80, 180) and speaker (82, 182) contained in a passenger compartment and activated whenever the detector (38, 138) senses an obstruction (36, 136) in the path of the cargo (10, 110). The detector (38, 138) and alarm components (80, 82, 180, 182) can communicate via an electrical cable (88, 188), or using wireless transmission (194, 196).

17 Claims, 6 Drawing Sheets

U.S. PATENT DOCUMENTS

| | | | |
|---|---|---|---|
| 5,208,586 A | 5/1993 | Friberg et al. | |
| 5,374,918 A | 12/1994 | Tharbs | |
| 5,389,912 A | 2/1995 | Arvin | |
| 5,424,713 A | 6/1995 | Thompson et al. | |
| 5,461,357 A | 10/1995 | Yoshioka et al. | |
| 5,581,232 A | 12/1996 | Tanaka et al. | |
| 5,710,553 A * | 1/1998 | Soares | 340/903 |
| 5,714,928 A | 2/1998 | Sudo et al. | |
| 5,828,320 A | 10/1998 | Buck | |
| 6,008,732 A * | 12/1999 | Lam | 340/425.5 |
| 6,114,950 A | 9/2000 | Schaible et al. | |
| 6,114,954 A | 9/2000 | Palett et al. | |
| 6,121,872 A | 9/2000 | Weishaupt | |
| 6,133,826 A | 10/2000 | Sparling | |
| 6,150,938 A | 11/2000 | Sower et al. | |
| 6,151,539 A | 11/2000 | Bergholz et al. | |
| 6,177,868 B1 | 1/2001 | Hollingsworth | |
| 6,178,650 B1 | 1/2001 | Thibodeaux | |
| 6,222,457 B1 | 4/2001 | Mills et al. | |
| 6,268,803 B1 | 7/2001 | Gunderson et al. | |
| 6,326,887 B1 | 12/2001 | Winner et al. | |
| 6,433,679 B1 | 8/2002 | Schmid | |
| 6,731,202 B1 | 5/2004 | Klaus | |
| 6,737,960 B2 | 5/2004 | Preston | |
| 7,046,127 B2 | 5/2006 | Boddy | |
| 7,089,114 B1 | 8/2006 | Huang | |
| 2004/0183661 A1 | 9/2004 | Bowman | |
| 2006/0033612 A1 | 2/2006 | Santa | |

FOREIGN PATENT DOCUMENTS

| | | |
|---|---|---|
| GB | 2 362 740 | 11/2001 |

\* cited by examiner

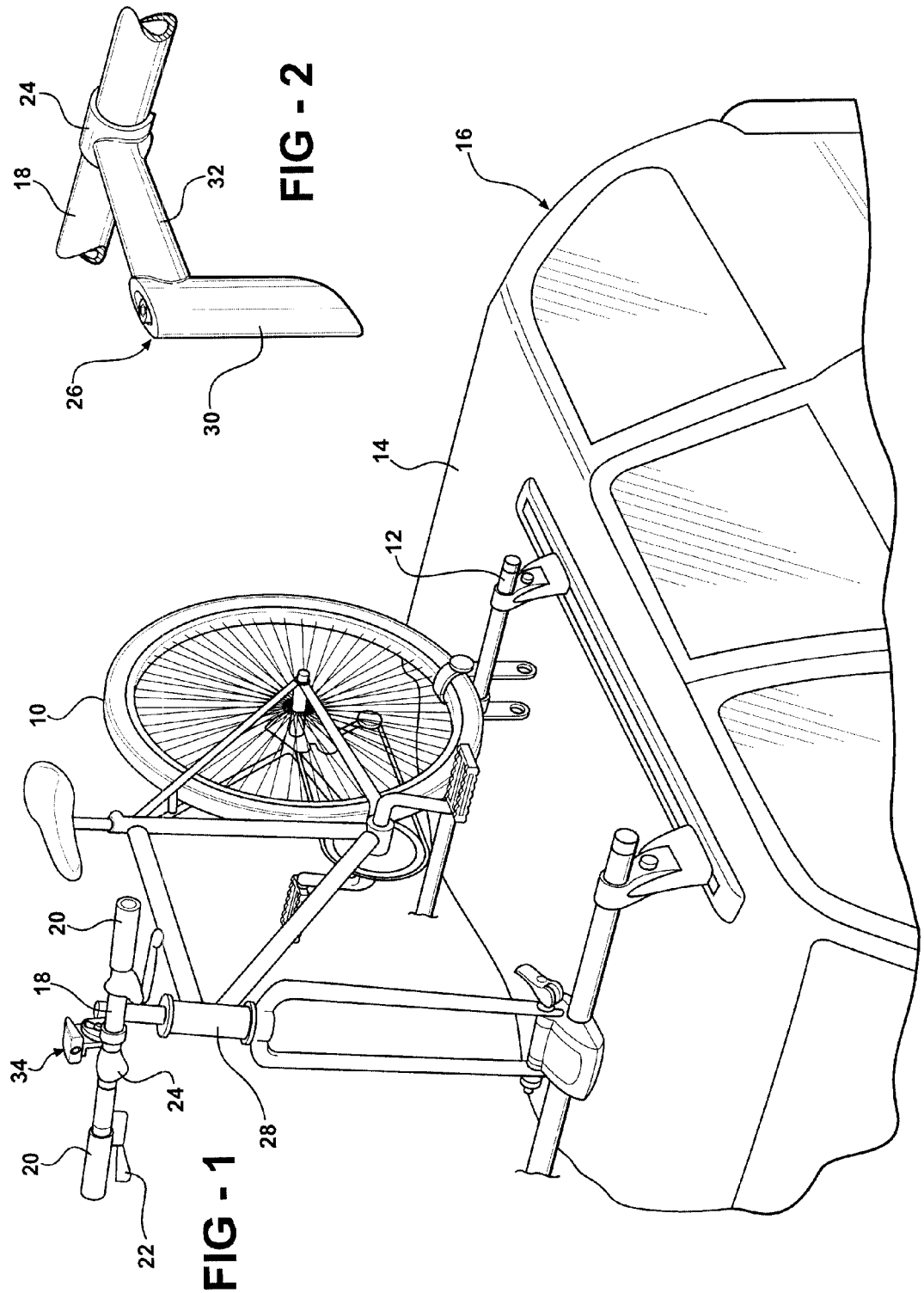

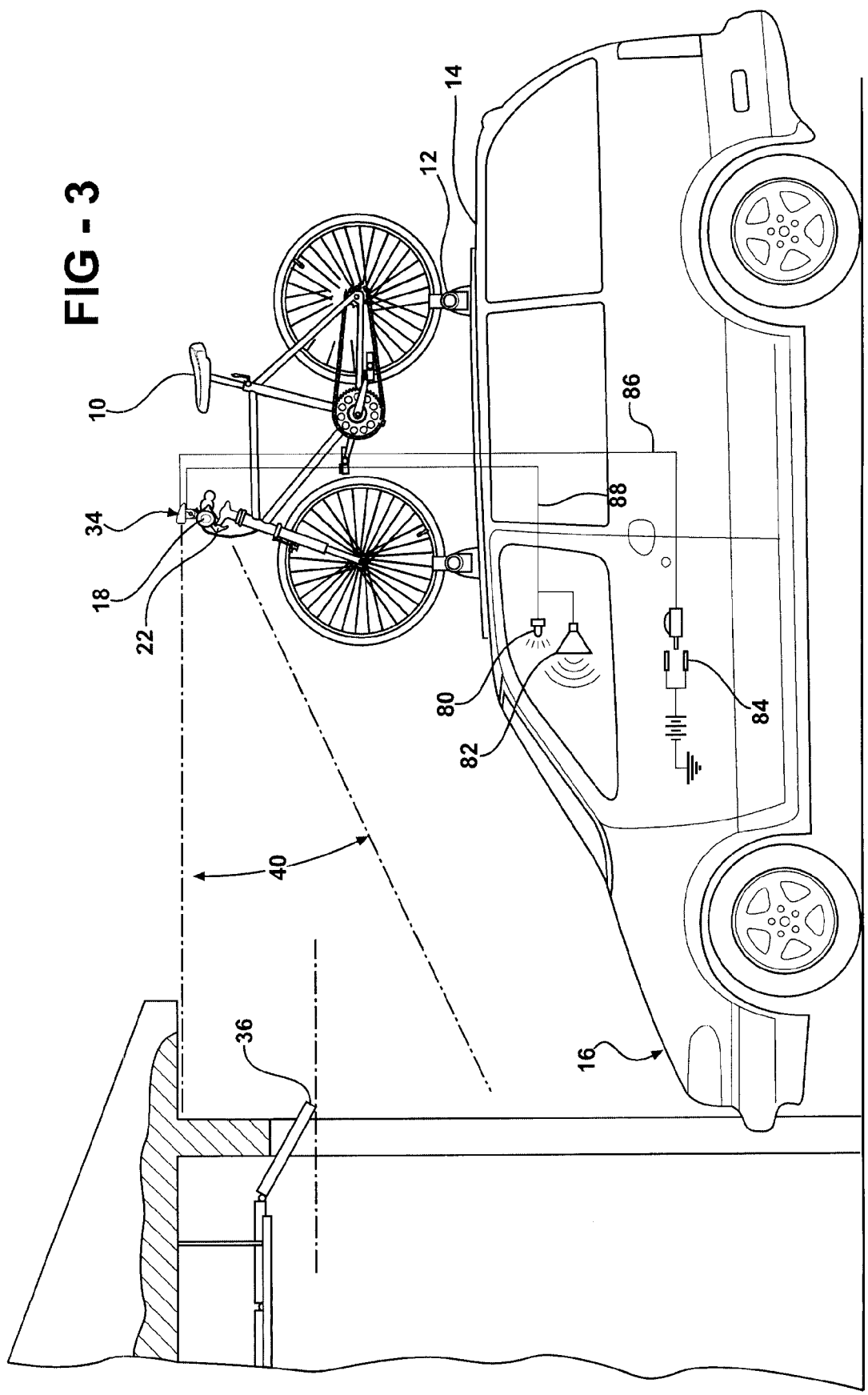

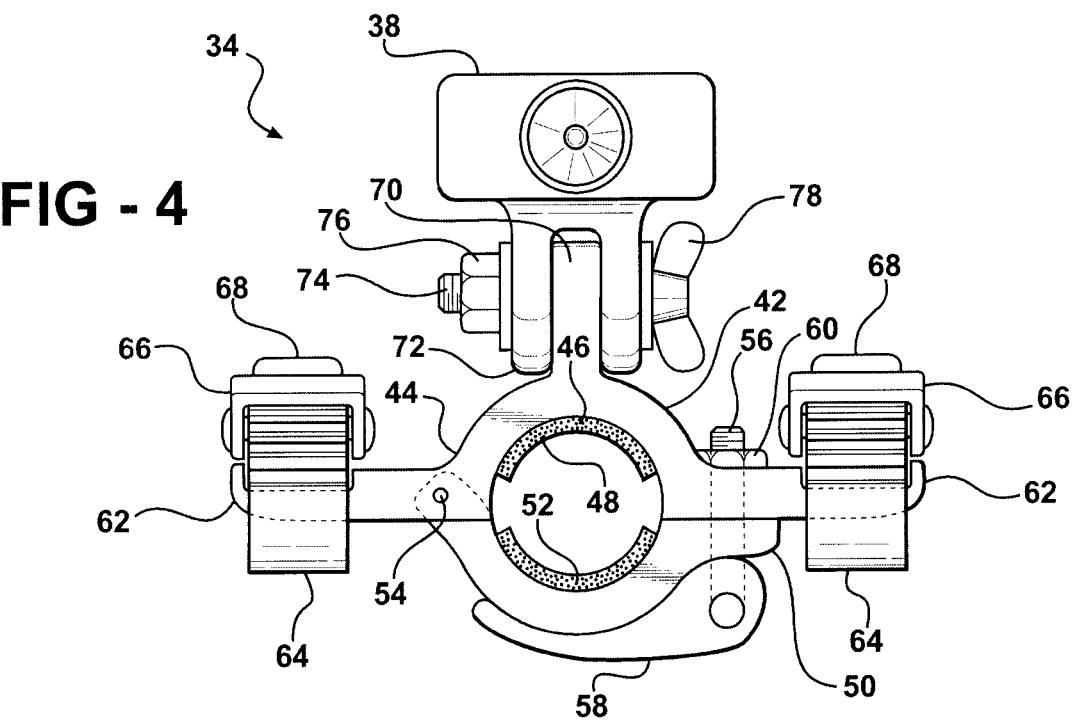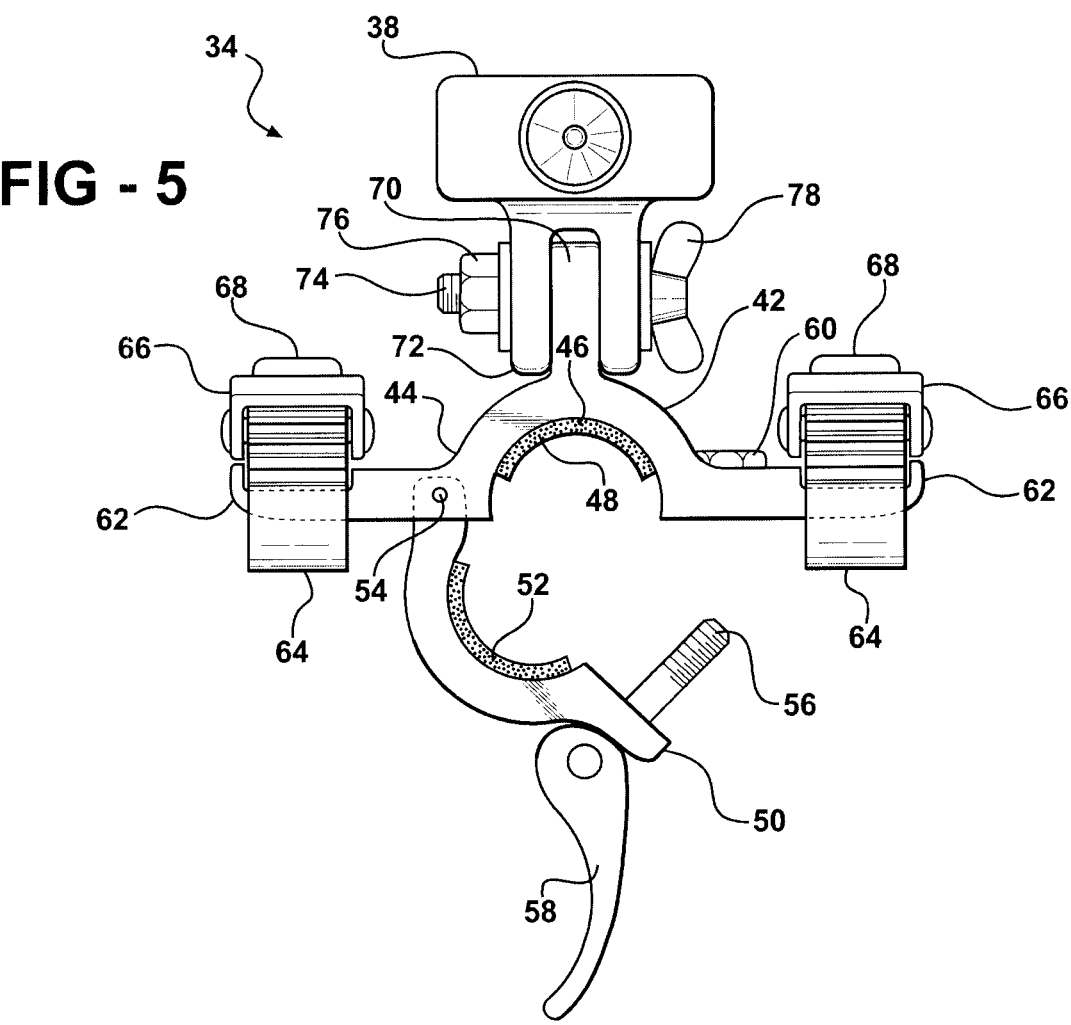

EARLY DETECTION SYSTEM AND METHOD FOR EXTERIOR VEHICLE CARGO

CROSS REFERENCE TO RELATED APPLICATIONS

The present application claims priority to U.S. provisional application entitled Sensor for Vehicle Exterior Loads having Ser. No. 60/734,084 and filed on Nov. 7, 2005.

BACKGROUND OF THE INVENTION

1. Field of the Invention

The invention relates generally to an early detection and alarm system for high-profile and/or elongated cargo carried on the outside of the vehicle, such as bicycles, canoes, luggage and the like. More specifically, the invention relates to a directional sensor which is mounted directly to and removed quickly from the cargo, and which interfaces with an alarm to produce a visual and/or audible warning signal inside the passenger compartment in the event of an on-coming obstruction, such as a low overhead opening that would otherwise collide with the cargo.

2. Related Art

It is in unfortunate but an all too common occurrence when a driver returns from a journey with a tall article of cargo mounted to the vehicle top or other exterior payload area, where the cargo extends above the vehicle. The driver may forgetfully enter a garage, carport, overhang at a drive-through restaurant, or other obstruction causing the high-profile cargo to strike the opening and resulting in severe damage to the cargo, the vehicle and/or the obstruction. Because high-profile cargo transported on an exterior payload area is usually out of the driver's view, and quite often much time will have lapsed since the cargo was secured, it is entirely understandable that the driver forgets that the high-profile cargo substantially increases the overhead clearance space needed for the vehicle. This may be especially problematic with large vans and SUV's whose normal overall height may be only inches shorter than the clearance of a standard residential garage door. Thus, practically any cargo mounted to the exterior of a van or SUV is likely to exceed the garage clearance, and also place the cargo on a collision course with other obstructions.

A similar problem may exist with high-profile loads secured in the exterior payload area of a pick-up truck or utility trailer. Also, elongated objects like ladders, while not typically high-profile, can increase the length of a vehicle such that parking distance relative to a wall is affected.

The prior art has taught a variety of techniques to address this situation. Examples of passive techniques include dangling small signs from the rearview mirror as a reminder to the driver. Other passive techniques have included attaching signage inside the garage door so that when the garage door opens, the signage reminds the driver that a high-profile load is on the vehicle. U.S. Pat. No. 5,710,553 to Soares describes a passage technique wherein a laser light source is attached to the highest point of the vehicle or cargo and projects a beam of light at an elevation generally equal to the maximum height of the high-profile cargo. Aside from the inherent safety issues associated with pointing laser beams in the direction of oncoming traffic, Soares is yet another example of a passive system which can only be marginally effective because it depends upon an alert driver. In other words, if the driver fails to take note of the signage or illuminated laser spots outside the vehicle, a collision will be imminent.

Examples of active warning systems include the use of radio frequency transmitters and receivers with the transmitter being mounted in the garage and the receiver mounted upon the vehicle roof-rack or other vehicle-top structure. An example of this technique may be found in U.S. Pat. No. 6,737,960 to Preston. When a vehicle moves into range of the transmitting garage or carport, an alarm is triggered at the receiver end thus reminding the driver of the high-profile cargo so as to avoid a collision. A particular disadvantage with this technique, however, is that it is only effective when the driver approaches his or her own garage which contains the transmitting device. If the driver attempts to pull into someone else's garage, or otherwise approaches a structure with a low overhang such as might be found in a drive-through restaurant, the vehicle alarm system is not triggered.

Another example of an active warning system may be found in U.S. Publication 2004/0183661, published Sep. 23, 2004, now abandoned. Bowman discloses mounting an ultrasonic transducer to the roof of a motor vehicle and directing its sensing area at an upward angle to accommodate high-profile loads carried on its rooftop. Because the transducer is mounted to the vehicle and angled upwardly, Bowman requires a complex calculation to determine the risk of collision based on relative vehicle speed and calculated distance to impact. Because the detection device must be oriented so as to project ultrasonic waves at an upward angle, the resultant accuracy of detecting a low clearance obstruction may be adversely affected. In addition, the sensing angle of the device is not related in any way to the overall height of the cargo carried on the rooftop. Therefore, the Bowman detection device will yield the same alerts regardless of whether a high-profile object like a bicycle is carried on the rooftop or a low profile article such as a ladder or kayak. In other words, the detection criteria is not connected to the height of cargo extending above the roofline. The Bowman system is even less effective in addressing elongated loads like ladders. If the forward end of the ladder projects into the sensing area, it will return a perpetual "false alarm" thus rendering the system ineffective. A similar result may occur when the cargo covers the sensor, as with long loads that extend past the front edge of the roof, like boats and cargo boxes. Bowman's sensor would be covered by the load and unable to effectively alert the driver.

The prior art also teaches the installation of permanent proximity sensors to a vehicle rear or front end to act as a warning system. See, for example, U.S. Pat. No. 6,133,826 to Sparling. Such permanently affixed sensors are only effective to protect the vehicle per se. If cargo is affixed to the exterior of the vehicle in such a manner as to increase its needed clearance space, such a sensor is ineffective to warn of an oncoming overhead structure. Likewise, if a long load such as an extension ladder or a canoe extends beyond the vehicle end, these prior art proximity sensors fail to adjust for the extended length of the cargo.

Accordingly, there exists a need for a method and system for alerting the driver transporting outside-mounted cargo that the vehicle is approaching an obstruction and that a collision with the cargo is imminent. Furthermore, there is a need for such a method and system that is infinitely adaptable to difference size loads and mounting positions on the vehicle.

SUMMARY OF THE INVENTION

The invention provides a method for transporting high-profile cargo on the exterior payload area of a motor vehicle without colliding into overhead obstructions. The method comprises the steps of providing a motor vehicle having a passenger compartment, an exterior payload area, and an electrical power receptacle. The method also includes securing an article of cargo to the exterior payload area such that the cargo extends above the motor vehicle. A detector is provided which is capable of remotely detecting a distant obstruction in the path of a cargo extending above the motor vehicle. An alarm is placed inside the passenger compartment, which alarm is capable of producing a warning signal inside the passenger compartment. A warning signal is automatically produced in response to the detector detecting an obstruction in the path of the cargo. The alarm is energized by directly electrically interconnecting the alarm to the power receptacle. The method also includes the step of attaching the detector directly to a portion of the cargo extending above the motor vehicle.

The subject invention overcomes the shortcomings and disadvantages found in prior art systems by providing an active warning system having a detector attached directly to some feature of the cargo that extends above the motor vehicle. By this method, an active warning system is combined with a detection mechanism relating directly to the cargo to which it is protecting. Thus, as the cargo changes, the detector adapts and thereby provides warning signals for oncoming obstructions that are relevant to that specific item of cargo.

The invention also contemplates an obstruction detection device for attaching directly to a high-profile cargo being transported on an exterior payload area of a motor vehicle to prevent collisions with overhead obstructions. The device comprises a detector for remotely detecting a distant obstruction in the path of the cargo. The detector includes a mounting member operatively associated with the detector for attaching the detector directly to the cargo. An alarm is provided for automatically producing a warning signal in response to the detector detecting an obstruction in the path of the cargo. The mounting member includes a releasable surround for enveloping and frictionally constricting at least a portion of the cargo so as to maintain the detector in a predetermined operational condition during transportation.

The subject detection device is particularly adapted for attachment directly to the cargo, as opposed to prior art systems in which a detector is attached to the vehicle per se. Because cargo is intended to be loaded and unloaded frequently, and because that cargo may change from one driving event to another, the mounting member provides an improved technique for mounting the detector onto the cargo directly. This is accomplished in the subject detection device by providing the releasable surround that both envelops and frictionally constricts at least a portion of the cargo. This enveloping frictional grip provided by the mounting member enables the detector to maintain a preferred operational orientation relative to the cargo during transportation, so that the sensing region of the detector remains pointing in a preferred orientation. In both the device and method embodiments of this invention, an elongated item of cargo can be fitted with the detector just as readily as a high-profile item of cargo such that a driver is alerted prior to a collision.

BRIEF DESCRIPTION OF THE DRAWINGS

These and other features and advantages of the present invention will become more readily appreciated when considered in connection with the following detailed description and appended drawings, wherein:

FIG. 1 is a fragmentary perspective view showing an exemplary bicycle as an article of cargo mounted to a roof-rack on top of a motor vehicle, and including a detection device according to the subject invention;

FIG. 2 is a fragmentary view of a steering assembly for a bicycle;

FIG. 3 is a simplified view showing a bicycle as an exemplary item of cargo mounted in a slightly different manner on a vehicular roof-rack and poised to enter a low overhead clearance garage;

FIG. 4 is a front view of a mounting member for the detection device as adapted for enveloping and frictionally constricting a bicycle steering assembly;

FIG. 5 is a view as in FIG. 4 but showing a stem clamp feature of the mounting member in an open position, such as during the attachment step;

DETAILED DESCRIPTION OF THE PREFERRED EMBODIMENT

Figure 6:
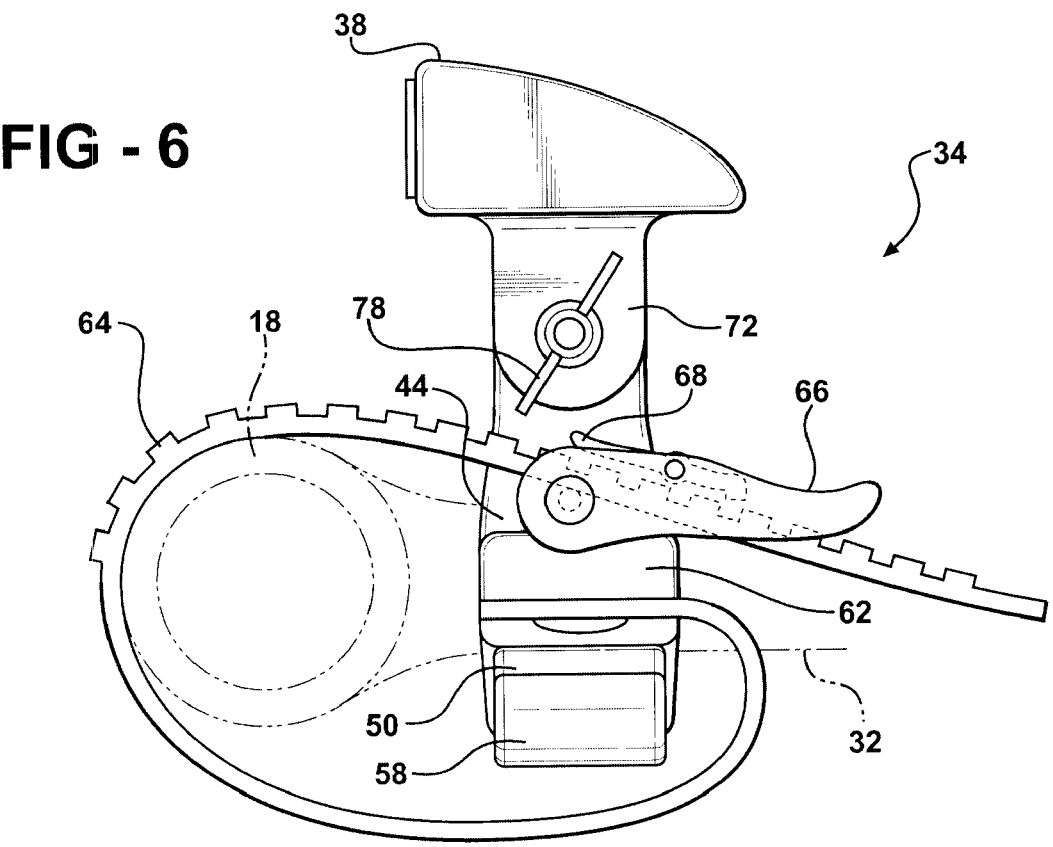
FIG. 6 is an end view of the detection device as viewed from Lines 6-6 in FIG. 4 and showing a fragment of a bicycle steering assembly in phantom.

Referring to the Figures, wherein like numerals indicate like or corresponding parts throughout the several views, a high-profile article of cargo is generally indicated at 10 in FIG. 1. The cargo 10 is depicted in FIGS. 1 and 3 in the form of a bicycle. However, the article of cargo may be any object whatsoever that is transported on an exterior payload area of a motor vehicle. Therefore, the cargo 10 may comprise a personal watercraft, a piece of luggage, an extension ladder, a refrigerator, a cargo box, a rooftop carrier, or any other article which can be attached to the exterior of a motor vehicle for transportation purposes. The exterior payload area of the motor vehicle is illustrated in the Figures as a frame-like cargo rack 12 affixed to the rooftop 14 of a passenger vehicle 16. In FIG. 1, the cargo rack 12 is configured in the well-known "fork mount" style to carry a bicycle, whereas in FIG. 3 the cargo rack 12 is configured in the alternative "upright mount" style. While such may be a more common expression of the invention, it is also contemplated that the exterior payload area may comprise the bed area of a pickup truck or the load carrying area of a utility trailer. Indeed, other variations may become evident to those of skill in the art. For example, cargo can be mounted to the front, rear, side or any other exterior location on the vehicle 16.

The bicycle example of a high-profile cargo item 10 is of the variety including handlebars 18 comprised of a straight or contoured tubular shaft having hand grips 20 at the outer ends thereof. The specific shape of the handlebars 18 is not particularly relevant to this invention. Often, the handlebars 18 will also carry control features 22 which might comprise brake levers, shift levers, headlights, cycle computers and the like. In FIG. 2, a typical bicycle steering construction is shown with the handlebars 18 securely retained in a sleeve 24 which forms part of the stem assembly, generally indicated at 26. The stem assembly 26 is secured within a head tube 28 (FIG. 1) using a head set of the type well-known in the art. The stem assembly 26 can take many shapes and configurations, but generally comprises a column member 30 which seats down into the head tube 28, and a lateral member 32 (stem) which interconnects the steer tube to the handlebar 18.

An obstruction detection device, generally indicated at 34, is provided for attaching directly to any high-profile or elongated cargo 10 being transported on an exterior payload area of a motor vehicle 10 to prevent collision with low overhead obstructions 36 walls, or other features. In FIG. 3, the obstruction 36 is illustrated as a common overhead garage door. However, the obstruction 36 can be any obstruction which would collide with that portion of the cargo 10 extending above or beyond the vehicle 16. This could be low bridges or overpasses, the overhang in a drive-thru restaurant, a covered parking structure, a tree branch, a wall, another vehicle, or any other such element.

The detection device 34 includes a detector 38 forming a head or sensing unit of the overall device 34. The detector 38 is so designed and calibrated so as to remotely detect a distant obstruction in the path of the cargo 10. Such sensing devices are capable of generating signals in response to the presence of a physical object occupying space within its sensing range. The specific technical details embodied within the detector 38 can be taken from any of the known forms. One such example may be found in U.S. Pat. No. 6,121,872 to Weishaupt, issued Sep. 19, 2000, the entire disclosure of which is hereby incorporated by reference. Another example may be had in U.S. Pat. No. 6,114,950 to Schaible et al., issued Sep. 5, 2000, the entire disclosure of which is hereby incorporated by reference. Yet another example of this technology may be found in U.S. Pat. No. 6,133,826 to Sparling, issued Oct. 17, 2000, the entire disclosure of which is hereby incorporated by reference. As is typical with such devices, the detector 38 has a directional sensing area which is illustratively represented between the broken lines at 40 in FIG. 3.

A mounting member 42 is operatively associated with the detector 38 for attaching the detector 38 directly to the cargo 10. The mounting member 42 can be either a universal system or specifically engineered for a particular type of cargo. In any configuration, the mounting member 42 includes a releasable surround for enveloping and frictionally constricting at least a portion of the cargo 10 so as to maintain the detector 38 in an predetermined operational condition during transportation. In other words, the releasable surround feature of the mounting member 42 provides an enveloping frictional grip on at least a portion of the cargo 10 which holds the detector 38 in its preferred orientation so that the sending area 40 is capable of detecting a distant obstruction in the path of the cargo 10.

In the embodiment depicted in FIGS. 1-7, the releasable surround feature of the mounting member 42 includes a bracket 44 for clamping at least two, but preferably three, spaced-apart anchoring regions of the cargo 10. The multiple spaced-apart anchoring regions are most preferably non-linear to one another. In other words, the plurality of spaced-apart anchoring regions are not aligned in such a manner as to permit rotation of the detector 38 while in operation. Rather, the discreet, spaced-apart anchoring regions provide an improved degree of stability with which to support the detector 38 in its predetermined operational orientation. As shown in FIGS. 4-7, the bracket 44 can be ideally configured for a bicycle type of cargo 10. Regardless of the type of cargo 10, however, it is essential that the bracket 44 provide a secure grip to the cargo 10 without marring its surface finish nor damaging the sensitive electrical components contained within the detector 38.

The bracket 44 as shown in FIGS. 4-7 includes a saddle 46 adapted to seat over the lateral member 32 of the stem assembly 26. The saddle 46 can be padded with a weather-resistant material such as foam strip 48. An articulating jaw 50 opposes the saddle 46 for compressing a tubular portion of the cargo 10 therebetween to achieve an enveloping frictional grip. In this example, the articulating jaw 50, which also includes a foam pad 52, compresses against the underside of the lateral member 32, opposite the saddle 46. The articulated jaw 50 may be pivoted at 54 in a clamping-like fashion to facilitate rapid attachment and detachment to the stem assembly 26. Although any quick-acting clamp arrangement may be suitable, FIGS. 4 and 5 depict one method for adjustably enveloping and frictionally constricting to various sized stems 26. This includes a threaded bolt 56 which carries at its head a cam lock lever 58. The bolt 56 is adapted for threadably engaging a nut 60 seated in the bracket 44 adjacent the saddle 46. Thus, the detector 38 can be quickly attached to and detached from a stem assembly 26 on a bicycle type of cargo 10 by clamping about the lateral member 32. The adjustable nature of the bolt 56 and cam lock lever 58 enable adjustment to fit various sized bicycle stems 26.

The bracket 44 may also include a pair of extending wings 62 which carry at their respective ends an adjustable strap 64. The adjustable straps 64 are perhaps best shown in FIGS. 6 and 7, and comprise the elements of the bracket 44 which stabilize the detector 38 from sideways motion when affixed, as an example, to the handlebars 18 of a bicycle. The adjustable straps 64 are anchored to the underside of the respective wings 62, however, those of skill will readily appreciate other fixation techniques and arrangements for the straps 64.

Figure 7:
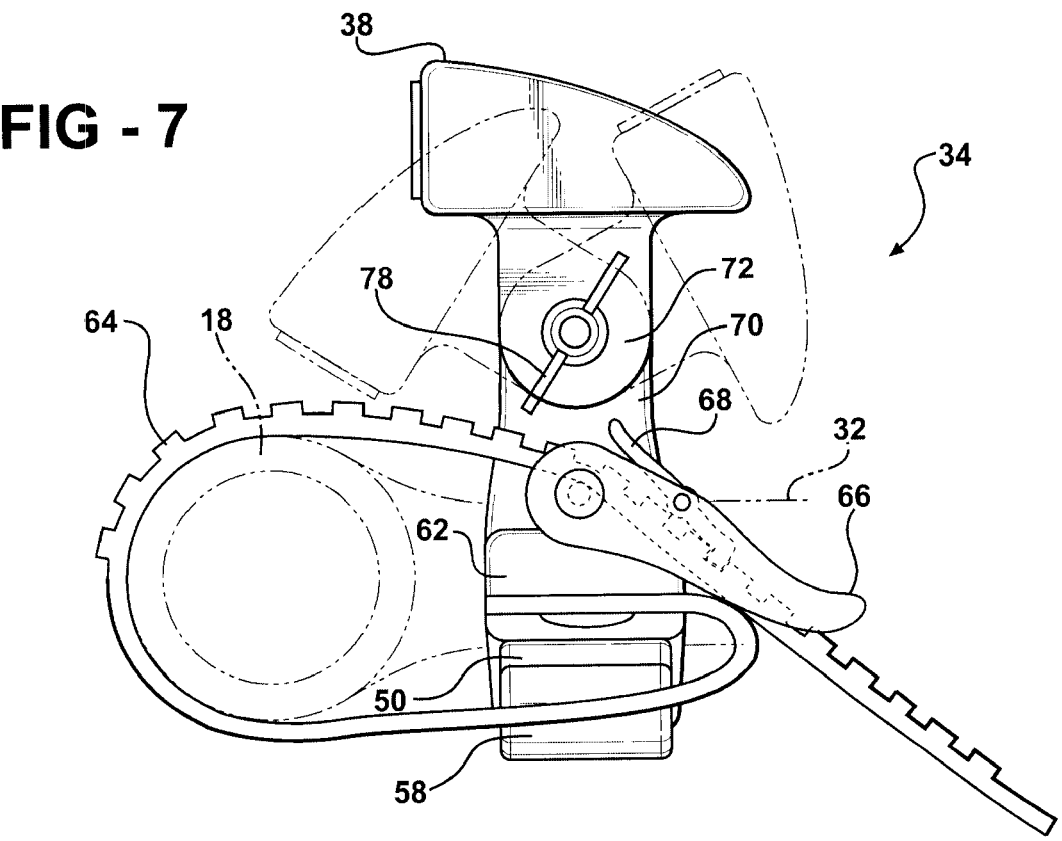
FIG. 7 is a view as in FIG. 6, but showing an adjustable handlebar strap enveloping and frictionally constricting the handlebar portion of the cargo and with the sensing head articulated between adjusted positions in phantom.

The flexible straps 64 may be of the cogged or toothed variety as depicted in FIG. 6 and 7, but this is not a requirement. An over-center latch 66 includes a pawl 68 that can be finger actuated into gripping engagement with the straps 64. As shown in FIG. 7, the straps 64 are wrapped around the handlebar 18 then pulled taught by rotating the latch 66 to an over-center condition whereupon the tension in the strap 64 maintains the bracket 44 in a locked condition while enveloping and frictionally constricting a portion of the cargo 10. Notably, the orientation of the latch 66 relative to the handlebars 18 is significant so that this over-center condition can be achieved. The adjustable straps 64 are thus effective, in combination with the opposing saddle 46 and articulated jaw 50, to provide a plurality of spaced points of constricting attachment upon the cargo 10. Specifically, the opposing saddle 46 and articulated jaw 50 prevent angular fore-and-aft (and vertical) displacement of the detector 38, whereas the adjustable straps 64 prevent angular side-to-side (and vertical) displacement. As a result, the detector 38 is securely held in position with its sensing area 40 maintained in a forward direction of the cargo 10 and of the vehicle 16 so as to detect when an obstruction 36 approaches a collision path with the cargo 10.

The bracket 44 preferably includes an articulating joint interconnecting the detector 38 in the mounting member 42 so that the detector 38 can be angularly adjusted relative to the mounting member 42 after attachment. This feature is perhaps best illustrated in FIG. 7, where the detector 38 is shown in phantom articulated between two extreme adjusted positions. The articulating joint better enables the sensing area 40 to be adjusted on a case-by-case basis so that the obstructions 36 can be properly detected for that specific item of cargo 10. Further to this purpose, it may be advisable to incorporate a bubble level or other orienting or signaling device to the detector 38 to improve the adjustment operation. The articulating joint may include a tongue 70 extending upwardly from the saddle 46 and matingly engaging a fork 72 depending from the detector 38. Articulation is accomplished through a hinge pin 74. The hinge pin 74 can be threaded and cooperate with a nut 76 and appropriate thumb grip 78 to form a locking feature for securely restraining the detector 38 in an adjusted position relative to the mounting member 42. Of course, other configurations of an articulating joint will be appreciated by those of skill in the art. For example, the tongue 70 and fork 72 can be inverted, as well as reconfigured into a ball and socket type joint, from bar linkage mechanism, or other arrangement. Regardless of the specific configuration chosen for the articulating joint, the end result is the ability for the user to orient the detector 38 on a case-by-case basis so that its sensing area 40 projects in a path most likely to detect an obstruction 36 on a collision path with the cargo 10.

Returning to FIG. 3, the detection device 34 is shown including an alarm for automatically producing a warning signal in response to the detector 38 detecting an obstruction 36 in a path of the cargo 10. In order to adequately alert the driver of an impending collision, various warning signals and strategies may be deployed. These may include the illumination of a light source 80 within the passenger compartment of the vehicle 16. Alternatively, or in addition to the light source 80, the alarm may also include a speaker 82 positioned inside the passenger compartment for sounding an audible alert to the driver. The light source 80 and speaker 82 can be used separately or in combination with a computer controller to provide intelligent feedback such as the distance to an impending collision, the height of an impending obstruction 36, and other such useful information. Such intelligent feedback is enabled through the aforementioned prior art teachings incorporated by reference into this disclosure.

In the example shown, the light source 80 and speaker 82 are electrically connected to a cigarette lighter power receptacle 84 in the motor vehicle 16. A long flexible electrical cable 86 engages the cigarette lighter receptacle 84 via an appropriate adaptor and routes electrical energy from the vehicle on-board electrical system directly to the detector 38. Then, a cable 88 extends from the detector 38 to the alarm components, which in this example include the light source 80 and the speaker 82. Thus, the detector 38 functions as a switch to close an electrical circuit between the cigarette lighter receptacle 84 and the alarm components 80, 82 when an obstruction 36 is detected. Alternatively, the cable 86 can be hard-wired to the vehicle electrical system or powered from batteries or other self-contained or self-generated means. Both cables 86, 88 may be routed into the passenger compartment through a door or window. Alternatively, the cable system can be substantially altered through the use of a wireless connection as will be described subsequently in connection with FIG. 9.

Figure 8:
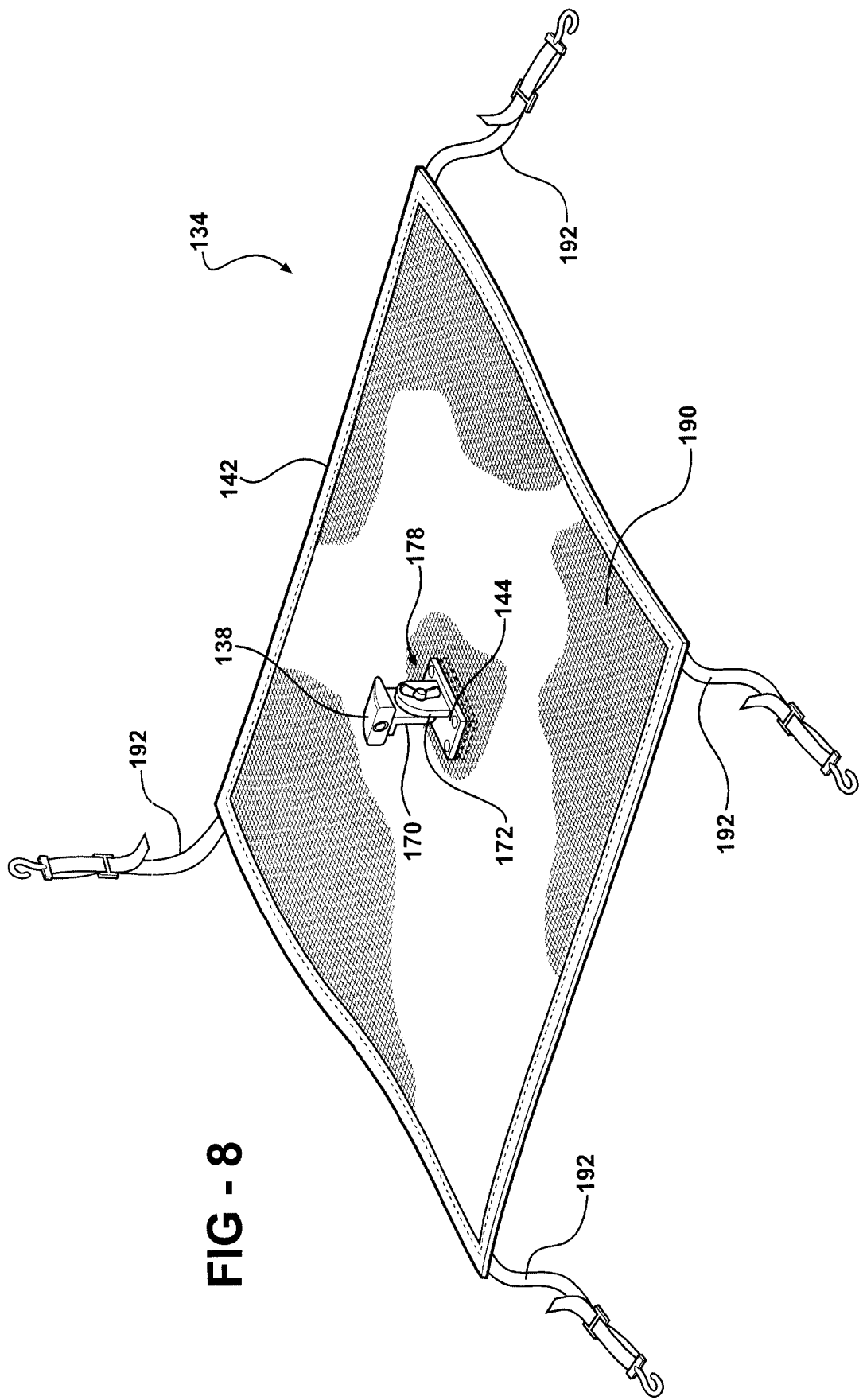
FIG. 8 is a simplified perspective view of a first alternative embodiment of the releasable surround of the mounting member including a flexible membrane adapted for enveloping and frictionally constricting at least a portion of the cargo.
Figure 9:
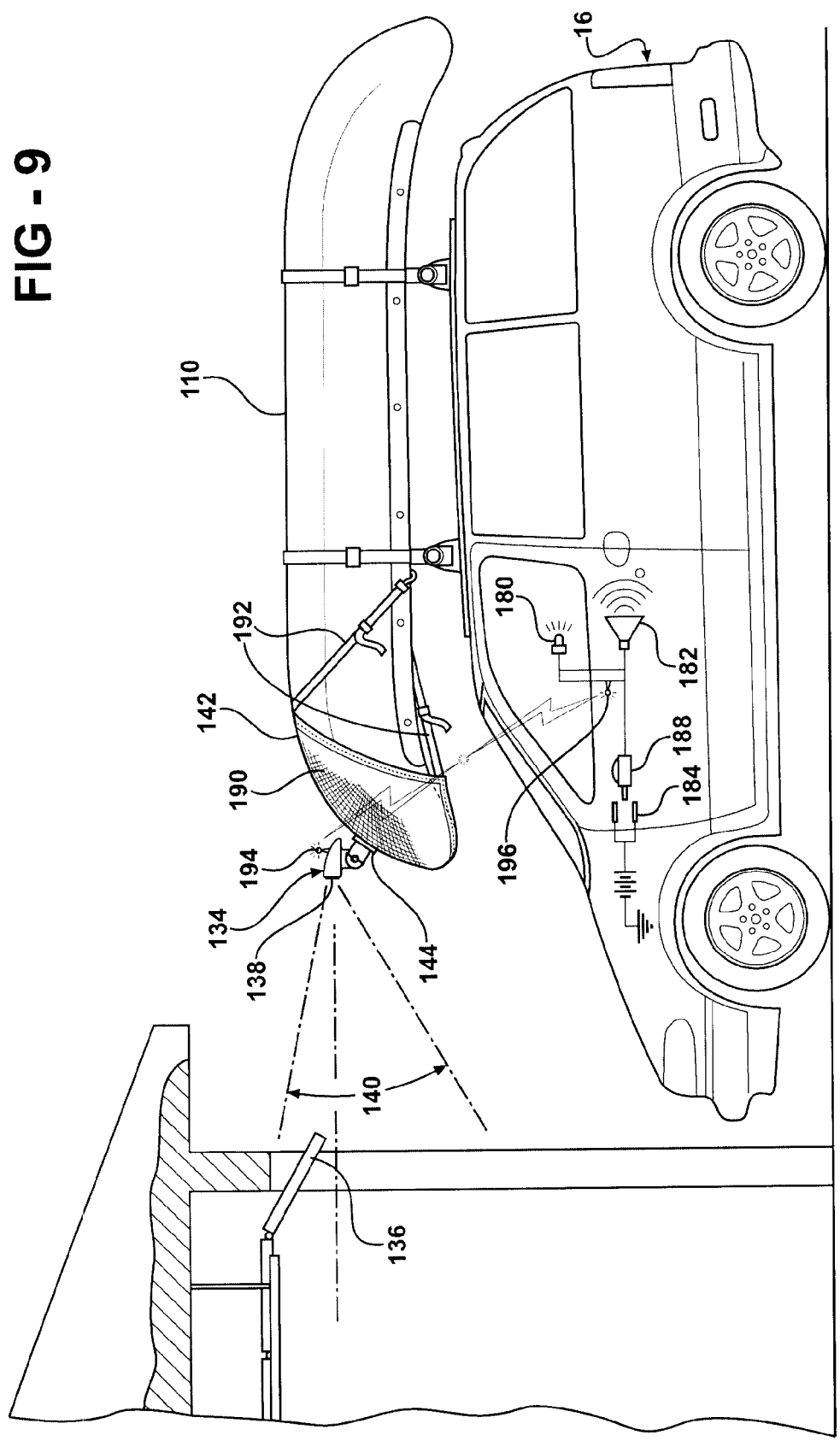
FIG. 9 is a simplified view showing an exemplary canoe as an elongated article of cargo mounted to the roof of a vehicle and fitted with the first alternative embodiment of the releasable surround.

Turning now to FIGS. 8 and 9, an alternative embodiment of the mounting member 142 is shown. In this alternative example, like or corresponding parts to those described previously are indicated using the same reference numerals preceded by the number 1. The mounting member 142 comprises a flexible membrane 190 preferably made from a tough, possibly stretchable material. Flexible membrane 190 can be netting or a tighter weave of fabric to which the bracket 144 is securely attached. An articulating joint feature includes components equivalent to those described above so as to enable angular adjustment of the detector 38 once the detection device 134 has been attached to an article of cargo 110. Articulation about two or three axes would provide beneficial added adjustability for this embodiment. A plurality of adjustable tension straps 192 extend from various places on the membrane 190 to securely envelop and frictionally constrict about an article of cargo 110.

FIG. 9 illustrates the cargo 110 in the form of a canoe. The flexible membrane 190 is shown enveloping and frictionally constricting about the leading end of the canoe, thereby fulfilling the function of the releasable surround feature. The tension straps 192 are shown extending rearwardly for attachment to a cargo rack 112 or other suitable anchoring points. In this condition, the detector 138 is custom-oriented so that its sensing area 140 projects forwardly of the canoe to detect the presence of an obstruction 136 such as a garage door at a height within contact range of the top of the canoe 110. When an object in the sensing area 140 is detected, the detector 138 alerts the driver via the light source 180 and/or speaker 182, or by other signaling indicia.

The detector 138 is shown in FIG. 9 including a wireless transmitter 194. The alarm features 180, 182 are provided with a wireless receiver 196 responsive to signals transmitted by the detector 138. In this configuration, the detector 138 is preferably energized by a self-contained energy source, such as batteries. The alarm components 180, 182, however, may more preferably be connected via cable 188 to the cigarette lighter receptacle 184 or directly to the vehicle electrical system. Of course, this alternative wireless connection between the detector 138 and the alarm components 180, 182 can be applied to the first embodiment of this invention, as well as to other variations of this invention as may be encompassed within any of the claims.

The invention has been described in an illustrative manner, and it is to be understood that the terminology which has been used is intended to be in the nature of words of description rather than of limitation. Obviously, many modifications and variations of the present invention are possible in light of the above teachings. For example, the detector 38/138 can be adapted to attach to any type of exterior mounted cargo 10/110 and is not limited to the bicycle and canoe embodiments shown in the drawings nor to the exemplary roof top applications. It is, therefore, to be understood that within the scope of the appended claims, the invention may be practiced otherwise than as specifically described.

What is claimed is:

1. A method for transporting high-profile cargo on the exterior payload area of a motor vehicle without colliding into overhead obstructions, said method comprising the steps of:
providing a motor vehicle having a passenger compartment, an exterior payload area, and an electrical power receptacle;
securing an article of cargo to the exterior payload area such that the cargo extends above the motor vehicle;
providing a detector capable of remotely detecting a distant obstruction in the path of the cargo extending above the motor vehicle;
placing an alarm inside the passenger compartment, the alarm being capable of producing a warning signal inside the passenger compartment;
automatically producing the warning signal in response to the detector detecting an obstruction in the path of the cargo;
energizing the alarm by directly electrically interconnecting the alarm to the power receptacle;
attaching the detector directly to a portion of the cargo extending above the motor vehicle; and
wherein the detector has a directional sensing area, further including the step of angularly adjusting the detector relative to the cargo after said step of attaching the detector directly to the cargo by relaxing a bracket having an articulating joint and then tightening the bracket to securely restrain the detector in an angularly adjusted position.

2. The method of claim 1 wherein said step of attaching the detector directly to the cargo includes clamping a plurality of discrete spaced anchoring regions of the cargo.

3. The method of claim 1 wherein said step of attaching the detector directly to the cargo includes stretching a membrane over at least a portion of the cargo.

4. The method of claim 1 further including the step of energizing the detector by directly connecting the detector to the power receptacle simultaneously with said step of energizing the alarm.

5. The method of claim 1 wherein said step of automatically producing the warning signal includes sounding an alarm within the passenger compartment.

6. The method of claim 1 wherein said step of automatically producing the warning signal includes illuminating a light source within the passenger compartment.

7. The method of claim 1 wherein said detector transmits a wireless signal in response to detecting a distant obstruction, and said alarm receives the transmitted signal and produces the warning signal in response thereto.

8. An obstruction detection device for attaching directly to a high-profile item of cargo being transported on an exterior payload area of a motor vehicle to prevent collisions with overhead obstructions, said device comprising:
   a detector for remotely detecting a distant obstruction in the path of the cargo; said detector including a mounting member operatively associated with said detector for attaching said detector directly to the cargo;
   an alarm for automatically producing a warning signal in response to said detector detecting an obstruction in the path of the cargo;
   said mounting member including a releasable surround for enveloping and frictionally constricting at least a portion of the cargo so as to maintain said detector in a predetermined operational condition during transportation; and
   an articulating joint interconnecting said detector and said mounting member for angularly adjusting said detector relative to said mounting member by relaxing said articulating joint and then subsequently tightening said articulating joint to securely restrain said detector in a different angularly adjusted position.

9. The device of claim 8 wherein said releasable surround includes a bracket for clamping to a plurality of discrete, spaced-apart anchoring regions of the cargo.

10. The device of claim 9 wherein said bracket includes a saddle and at least one adjustable strap.

11. The device of claim 9 wherein said bracket includes an articulating jaw opposing said saddle for compressing a tubular portion of the cargo therebetween.

12. The device of claim 8 wherein said releasable surround includes a flexible membrane adapted for stretching over at least a portion of the cargo.

13. The device of claim 12 wherein said membrane includes a plurality of adjustable tension straps extending therefrom.

14. The device of claim 13 wherein said articulating joint includes a locking feature for securely restraining said detector in an adjusted position relative to said mounting member.

15. The device of claim 13 wherein said articulating joint includes a tongue extending from one of said mounting member and said detector and a fork extending from the other of said mounting member and said detector, said tongue matingly engaging said fork of said detector.

16. The device of claim 8 wherein said detector includes a wireless transmitter and said alarm includes a wireless receiver responsive to signals transmitted by said detector.

17. The device of claim 8 wherein said alarm includes a cigarette lighter adapter for electronically connecting to a cigarette lighter power receptacle in the motor vehicle.

\* \* \* \* \*